United States Patent Office.

AMOS H. TYLER, OF TOLEDO, OHIO.

Letters Patent No. 93,141, dated July 27, 1869.

IMPROVED CHEWING-GUM COMPOUND.

The Schedule referred to in these Letters Patent and making part of the same.

*To whom it may concern:*

Be it known that I, AMOS H. TYLER, of Toledo, Lucas county, Ohio, have invented a new Compound for Making Chewing-Gum; and I hereby declare the following to be a full, clear, and exact description of the same.

The nature of this compound relates to that class of articles called chewing-gums.

The proportions of the ingredients are substantially as follows, (large quantities in like proportion:)

White rosin, one (1) pound; olive-oil, one and one-half (1½) ounce.

To make the gum, place the ingredients in a suitable vessel, and the vessel in a boiler or kettle partly filled with water, which water is then heated sufficiently to melt the rosin, which should be stirred until thoroughly mixed with the oil.

The mixture thus prepared is cooled in water until of proper temperature to be readily handled, when it is pulled or stretched, until it assumes a clear white color and becomes partially brittle.

It is then cut into lengths or sticks, as desired, wrapped, and packed for sale and use.

What I claim, and desire to secure by Letters Patent, is—

The combination and use of the ingredients, as herein described, when prepared and used substantially as and for the purposes specified.

AMOS H. TYLER.

Witnesses:
C. E. BLIVEN,
C. G. WINFIELD, Jr.